United States Patent
Funabashi et al.

[11] Patent Number: 5,839,397
[45] Date of Patent: Nov. 24, 1998

[54] ENGINE COOLING SYSTEM AND CONSTRUCTION MACHINE

[75] Inventors: Shigehisa Funabashi; Yoshihiro Takada; Masatoshi Watanabe; Shinichi Shimode, all of Ibaraki-ken; Yoshio Tanito; Sotaro Tanaka, both of Ushiku; Zenji Kaneko, Tsukuba; Ichiro Hirami, Tamano; Toshio Takishita, Ibaraki-ken; Shinichi Mihara, Tsuchiura, all of Japan

[73] Assignee: Hitachi Construction Machinery Co. Ltd., Tokyo, Japan

[21] Appl. No.: 860,278

[22] PCT Filed: Oct. 18, 1996

[86] PCT No.: PCT/JP96/03025

§ 371 Date: Jun. 17, 1997

§ 102(e) Date: Jun. 17, 1997

[87] PCT Pub. No.: WO97/14874

PCT Pub. Date: Apr. 24, 1997

[30] Foreign Application Priority Data

Oct. 19, 1995 [JP] Japan .................................. 7-271117

[51] Int. Cl.⁶ .......................................................... F01P 7/14
[52] U.S. Cl. ..................... 123/41.01; 123/41.49; 415/206
[58] Field of Search ............................. 123/41.01, 41.11, 123/41.49, 41.55; 415/206, 97; 416/223 B, 178, 187

[56] References Cited

U.S. PATENT DOCUMENTS 3,642,062 2/1972 Edmaier et al. ........................ 415/97
3,780,411 12/1973 Bulin ...................................... 415/206
5,478,275 12/1995 Malm ..................................... 416/178

FOREIGN PATENT DOCUMENTS

| 56-70117 | 6/1981 | Japan . |
| 58-73925 | 5/1983 | Japan . |
| 63-270228 | 11/1988 | Japan . |
| 2-19823 | 2/1990 | Japan . |
| 5-248239 | 9/1993 | Japan . |
| 5-248242 | 9/1993 | Japan . |
| 5-288053 | 11/1993 | Japan . |

*Primary Examiner*—John T. Kwon
*Attorney, Agent, or Firm*—Fay, Sharpe, Beall, Fagan, Minnich & McKee

[57] ABSTRACT

First cooling air (50) enters an engine room (1) through a cooling air inlet port (7a) from the exterior of the engine room (1), and is throttled by a suction tube (8a) after passing heat exchangers such as an intercooler (6a), an oil cooler (6b) and a radiator (6c), followed by entering a centrifugal fan (4). The first cooling air (50) is then blown off toward an outer circumference of the centrifugal fan (4). Second cooling air enters the engine room (1) through cooling air inlet ports (7b, 7b) from the exterior of the engine room (1), and flows around an engine (5), various electric equipments such as an alternator (10), and an oil pan (14) while cooling them. The second cooling air is then throttled by a suction tube (8b) before entering the centrifugal fan (4), and blown off toward the outer circumference of the centrifugal fan (4). Two streams of the first and second cooling air (50, 51) are discharged to the exterior through an exhaust port (9). This arrangement enhances the degree of sealing on the engine (5) side to reduce noise, and improves the effect of cooling the electric equipments (10) for higher reliability of the electric equipments (10).

9 Claims, 11 Drawing Sheets

ENGINE COOLING SYSTEM AND CONSTRUCTION MACHINE

TECHNICAL FILED

The present invention relates to an engine cooling system, particularly a cooling system for engines equipped on automobiles or construction machines, for example, and a construction machine employing the engine cooling system.

BACKGROUND ART

Known techniques relating to the above type of engine cooling system are, for example, as follows.

(1) JP-A-5-288053

This known technique discloses that, in an engine cooling portion of a construction machine, cooling air is supplied to a heat exchanger by an axial fan coupled to an engine crankshaft through a fan belt.

(2) JP-A-5-248239

This known technique discloses that, in an engine cooling portion of a working vehicle such as an agricultural tractor, a centrifugal fan is used as a fan for supplying cooling air to enhance a cooling ability.

(3) JP-A-5-248242

With this known technique, a single centrifugal fan is employed such that cooling air taken in from the front of an agricultural machine and having passed a radiator is sucked into the centrifugal fan from the front thereof, and cooling air from an engine room rearward of the centrifugal fan is sucked into the centrifugal fan from the back thereof.

DISCLOSURE OF THE INVENTION

The above known techniques have problems below.

Generally, in an engine room, an air cooling ability required for cooling external surfaces of an engine is much smaller, e.g., about ⅓ or less, than an air cooling ability required for cooling heat exchangers such as a radiator and an oil cooler. In the above known techniques (1) and (2), however, because cooling air heated to high temperature after cooling the heat exchangers such as the radiator flows into the engine side as it is, the flow rate of cooling air is the same between the heat exchanger side and the engine side. Stated otherwise, because the cooling air is discharged at a large flow rate necessary for cooling the heat exchanger side in its entirety through an exhaust port formed on the engine side, an opening defining the exhaust port has a very large size. This results in a reduction in the degree of sealing on the side of the engine that is the greatest noise source, and hence a difficulty in reducing noise.

Also, many electric equipments, etc. are usually mounted in the engine room around the engine. In the above known techniques (1) and (2), however, because air heated to high temperature after cooling the heat exchangers such as the radiator flows around the electric equipments, the effect of cooling the electric equipments is so reduced as to raise a problem in reliability of the electric equipments.

On the other hand, such a problem is avoided in the above known technique (3) because cooling air for cooling the electric equipments around the engine is introduced through a different flow path from that of cooling air passing the radiator and high-temperature air heated after cooling the radiator is not introduced to the electric equipments. However, the above known technique (3) has another problem as follows.

The centrifugal fan employed in the above known technique (3) is illustrated as functioning as a double-suction centrifugal fan which sucks cooling air from two directions, i.e., from the radiator side and the engine side. In substance, however, the known centrifugal fan is made up of one single-suction centrifugal fan having one impeller. This impeller is designed to positively suck air on the radiator side and induce cooling air. For air on the engine side, however, a gap is defined on the back side of the fan, allowing air to be merely introduced through the gap under negative pressure. Thus, the impeller is not structured so as to positively suck air on the engine side and induce cooling air. As a result of such a structure, the flow rate of cooling air on the engine side is much smaller than that of cooling air on the radiator side. Also, the amounts of cooling air sucked from both the directions are instable in relative relation. Accordingly, the electric equipments, etc. cannot be cooled sufficiently.

The present invention intends to solve the foregoing problems encountered in the known techniques, and its object is to provide an engine cooling system and a construction machine, which can improve the degree of sealing on the engine side for a reduction in noise, and can sufficiently cool electric equipments, etc.

To achieve the above object, according to the present invention, there is provided an engine cooling system comprising at least one heat exchanger disposed in an engine room with an engine mounted therein and including a radiator for cooling water to cool the engine, and a cooling fan rotated through a rotary shaft for inducing cooling air to cool the heat exchanger, the engine, and electric equipments disposed around the engine, wherein the cooling fan is a centrifugal fan of a centrifugal double-impeller structure for inducing first cooling air taken into the engine room through a first air inlet port to cool the heat exchanger, and second cooling air taken into the engine room through a second air inlet port to cool the engine and the electric equipments, and the centrifugal fan is constructed to meet $W1:W2 = 2:0.5 - 2:1.5$ on an assumption that flow rates of the first cooling air and the second cooling air induced by the centrifugal fan are $W1$ and $W2$, respectively.

Specifically, the first cooling air induced by one impeller of the centrifugal double-impeller structure is taken into the engine room through the first air inlet port for cooling the heat exchanger. After that, the first cooling air is sucked into the first impeller from one end side of the rotary shaft and then blown off toward an outer circumference of the fan. Also, the second cooling air induced by the other impeller of the centrifugal double-impeller structure is taken into the engine room through the second air inlet port for cooling the engine and the electric equipments, etc. around the engine. After that, the second cooling air is sucked into the second impeller from the other end side of the rotary shaft and then blown off toward the outer circumference of the fan.

With the above arrangement, a cooling flow path of the second cooling air for cooling the engine side can be separated from a cooling flow path of the first cooling air for cooling the heat exchanger. Therefore, it is no longer required to discharge cooling air at a large flow rate from the engine side unlike conventional, and the flow rate of the second cooling air can be set to a smaller value just required for cooling the engine side. Accordingly, the size of an opening to be formed on the engine side can be set smaller than conventional, which results in the improved degree of sealing on the engine side and a reduction in noise.

Also, since the cooling flow path of the second cooling air for cooling the engine side has a different route from the cooling flow path of the first cooling air for cooling the heat exchanger, high-temperature air heated after cooling the heat exchanger is prevented from flowing around the electric equipments, etc. unlike conventional. It is thus possible to enhance the effect of cooling the electric equipments, etc. and to improve the reliability of the electric equipments, etc.

It is generally known that, of the total heat value 100% generated by an engine, the percentage of the heat value consumed by cooling of radiator water is about 30% and the percentage of the heat value consumed as radiation heat from outer walls of the engine is about 15%. Here, the former percentage practically corresponds to the heat value cooled by the first cooling air in the radiator and the latter percentage practically corresponds to the heat value cooled by the second cooling air around the engine. Therefore, on an assumption that the heat value to be cooled is practically in proportion to the flow rate of cooling air, it is optimum from the standpoint of heat value balance that the centrifugal fan having the centrifugal double-impeller structure is constructed to provide the ratio W1:W2=2:1 of the flow rate of the first cooling air to the flow rate of the second cooling air. By so setting the flow rate ratio, the loss of horsepower consumed by the centrifugal fan can be suppressed and a reduction in fuel economy can be prevented. Also, since the centrifugal fan is not needed to be rotated at a rotational speed in excess of a required value, noise can be educed. Further, overcooling of the engine can be avoided that may occur due to the excessive flow rate W2 of the second cooling air.

Taking into account variations in an actual engine room caused by a difference in resistance against passing air between the flow path on the heat exchanger side through which the first cooling air passes and the flow path on the engine side through which the second cooling air passes, manufacturing errors and so on, however, a proper range of the flow rate ratio of the first cooling air to the second cooling air is W1:W2=2:0.5–2:1.5.

In the above engine cooling system, preferably, the centrifugal fan is constructed to meet W1:W2=2:1 on an assumption that flow rates of the first cooling air and the second cooling air induced by the centrifugal fan are W1 and W2, respectively.

In the above engine cooling system, preferably, the centrifugal fan comprises one double-suction impeller made up of a first impeller portion fixed to a hub, which is fixed to the rotary shaft, for sucking the first cooling air from one end side of the rotary shaft and blowing off the first cooling air toward an outer circumference of the fan, and a second impeller portion fixed to the hub on the side opposite to the first impeller portion for sucking the second cooling air from the other end side of the rotary shaft and blowing off the second cooling air toward the outer circumference of the fan.

In the above engine cooling system, preferably, the centrifugal fan comprises a first single-suction impeller fixed to a first hub, which is fixed to the rotary shaft, for sucking the first cooling air from one end side of the rotary shaft and blowing off the first cooling air toward an outer circumference of the fan, and a second single-suction impeller fixed to a second hub, which is fixed to the rotary shaft, for sucking the second cooling air from the other end side of the rotary shaft and blowing off the second cooling air toward the outer circumference of the fan.

Also, preferably, the above engine cooling system further comprises a spiral case disposed near an outlet region of the centrifugal fan for slowing down the cooling air blown off from the centrifugal fan to restore pressure of the blown-off cooling air.

With this feature, the swirling components contained in streams from outlets of the centrifugal fan, which have been all wasted as pressure loss in the past, can be restored as a pressure, and therefore the fan efficiency can be improved. Hence, the cooling air can be induced at a larger flow rate and a higher pressure correspondingly. As a result of such a higher pressure of the cooling air, the degree of sealing of the engine room can be increased and noise can be further reduced correspondingly.

In the above engine cooling system, preferably, a noise absorbing material is attached to at least part of an internal surface of the spiral case.

This feature is effective in making the engine room quieter as a whole because noise produced by the centrifugal fan, which is one of major noise sources, can be absorbed by the noise absorbing material.

Also, preferably, the above engine cooling system further comprises driving means for transmitting driving forces to rotate the rotary shaft of the centrifugal fan and enabling a rotational speed of the centrifugal fan to be set independently of a rotational speed of the engine.

Specifically, the rotational speed of the centrifugal fan is set independently of the rotational speed of the engine by the driving means for uniquely generating driving forces from electric energy or hydraulic energy, for example, regardless of the engine rotation. This enables the centrifugal fan to be rotated at an optimum rotational speed depending on working circumstances without being affected by the rotational speed of the engine (=rotational speed of a water pump). In work at low temperature, for example, if the fan is rotated directly depending on the engine rotation, overcooling of the engine may occur due to the excessive rotation of the centrifugal fan resulted from securing a usual rated rotational speed of the engine. By contrast, in the present invention, since the rotational speed of the centrifugal fan can be set to a smaller value while maintaining the rotational speed of the engine at the usual rated value, the engine can be avoided from lowering its performance due to overcooling, and the lower rotational speed of the centrifugal fan can prevent an increase in noise generated from the fan. As another example, in work performed in highlands, if the fan is rotated directly depending on the engine rotation, a reduction in engine performance may occur due to deficiency of the cooling ability and resultant overheating of the engine, because the engine rotational speed is set to a smaller value to prevent stalling of the engine and the rotational speed of the centrifugal fan is reduced correspondingly. By contrast, in the present invention, since the rotational speed of the engine can be set to a smaller value while maintaining the rotational speed of the centrifugal fan as usual, the engine can be avoided from lowering its performance due to overheating.

In the above engine cooling system, preferably, the driving means is any one of means for generating the driving forces from electrical energy and means for generating the driving forces from hydraulic energy.

Further, according to the present invention, there is provided a construction machine comprising an engine mounted in an engine room, a hydraulic pump driven by the engine, actuators driven by a hydraulic fluid delivered from the hydraulic pump, and an engine cooling system including at least one heat exchanger including a radiator for cooling water to cool the engine, and a cooling fan rotated through a rotary shaft for inducing cooling air to cool the heat exchanger, the engine, and electric equipments disposed around the engine, wherein the cooling fan is a centrifugal fan of a centrifugal double-impeller structure for inducing first cooling air taken into the engine room through a first air inlet port to cool the heat exchanger, and second cooling air taken into the engine room through a second air inlet port to cool the engine and the electric equipments, and the centrifugal fan is constructed to meet W1:W2=2:0.5–2:1.5 on an assumption that flow rates of the first cooling air and the second cooling air induced by the centrifugal fan are W1 and W2, respectively.

BEST MODE FOR CARRYING OUT THE INVENTION

Hereunder, embodiments of an engine cooling system of the present invention will be described with reference to the drawings. Any of the embodiments described below represents an embodiment of the engine cooling system installed in an engine room of a hydraulic excavator comprising a hydraulic pump driven by an engine and actuators driven by a hydraulic fluid delivered from the hydraulic pump.

First Embodiment

A first embodiment of the present invention will be described with reference to FIGS. 1 to 6. This embodiment embodies the invention as an engine cooling system which is installed in an engine room of a hydraulic excavator.

Figure 1:
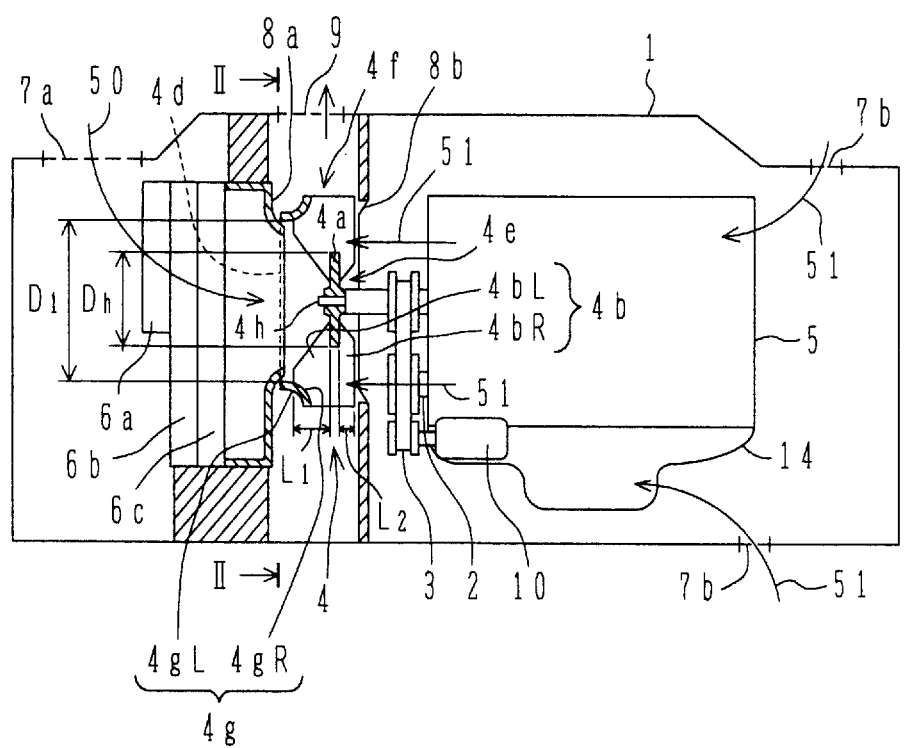
FIG. 1 is a side sectional view showing the structure of an engine room of a hydraulic excavator to which a first embodiment of the present invention is applied.

FIG. 1 is a side sectional view showing the structure of an engine room of a hydraulic excavator to which this embodiment is applied.

In FIG. 1, the engine cooling system of this embodiment is installed in an engine room 1 in which an engine 5 is mounted. The engine cooling system mainly comprises an intercooler 6a for precooling combustion air supplied to the engine 5, an oil cooler 6b for cooling a working fluid for the hydraulic excavator, a radiator 6c for cooling water to cool the engine 5, a centrifugal fan 4 driven by a fan belt 3 to which power is transmitted from a crankshaft 2 of the engine 5, and suction tubes 8a, 8b for introducing two streams of cooling air 50, 51 (described later) to two suction openings of the centrifugal fan 4, respectively. In upper and lower walls of the engine room 1, there are formed a first air inlet port, e.g., a cooling air inlet port 7a, and a second air inlet port, e.g., cooling air inlet ports 7b, for taking ambient air into the engine room, as well as an exhaust port 9 for discharging air therefrom. Further, electric equipments such as an alternator 10 are installed in the engine room 1 near the engine 5.

Figure 2:
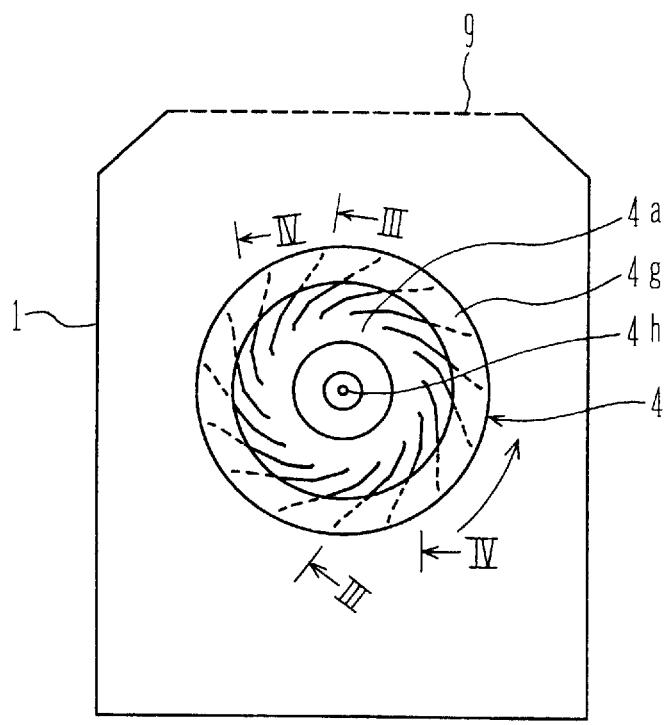
FIG. 2 is a view looking from plane II—II as indicated by arrows in FIG. 1.
Figure 3:
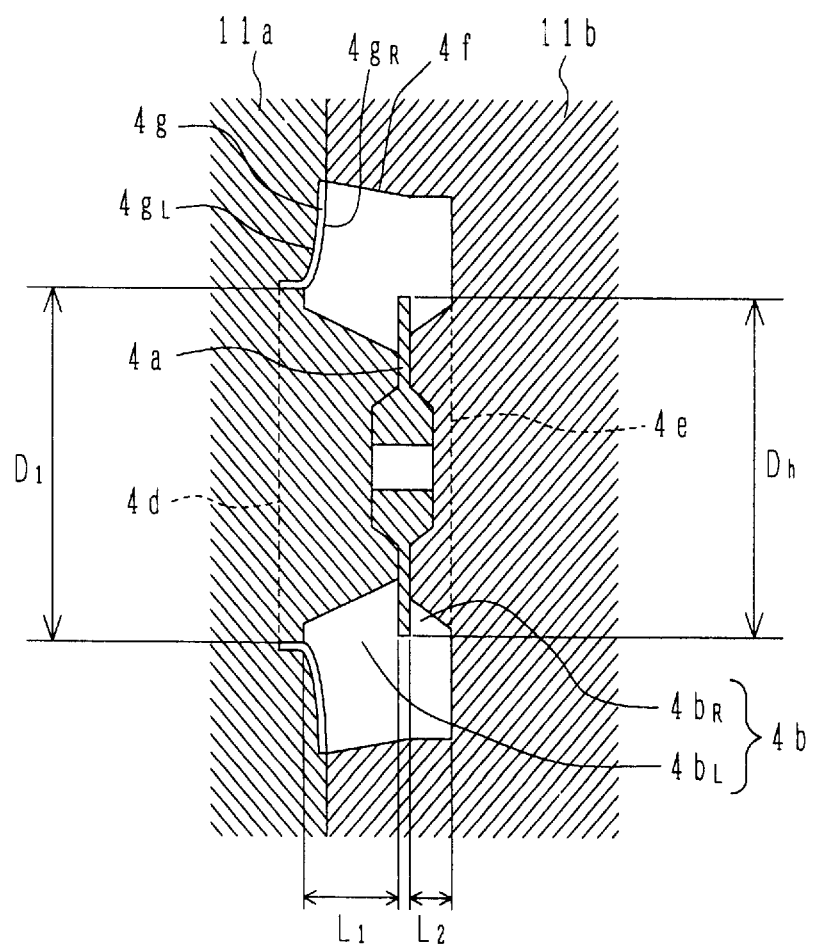
FIG. 3 is a sectional view of presser molds for shaping a centrifugal fan, the view corresponding to a section taken along line III—III in FIG. 2.
Figure 4:
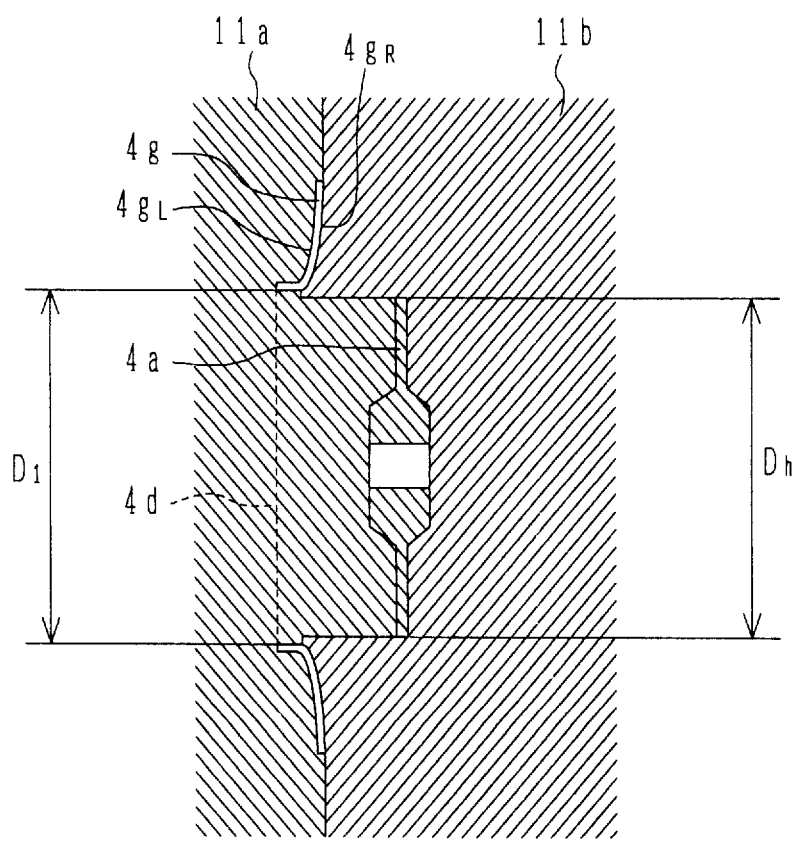
FIG. 4 is a sectional view of the presser molds for shaping the centrifugal fan, the view corresponding to a section taken along line IV—IV in FIG. 2.

FIG. 2 is a view looking from plane II—II as indicated by arrows in FIG. 1, the view showing the detailed structure of the centrifugal fan 4, FIG. 3 is a sectional view of presser molds 11a, 11b for shaping the centrifugal fan 4, the view corresponding to a section taken along line III—III in FIG. 2, and FIG. 4 is a sectional view of the presser molds 11a, 11b for shaping the centrifugal fan, the view corresponding to a section taken along line IV—IV in FIG. 2. In FIGS. 3 and 4, for easier understanding of relation between portions of a shaping cavity and portions of the centrifugal fan 4, the portions of the shaping cavity are denoted by the same reference numerals as the corresponding portions of the centrifugal fan 4.

In FIGS. 1 to 4, the centrifugal fan 4 is of a centrifugal double-impeller structure comprising two centrifugal impeller structures. The centrifugal fan 4 comprises a hub plate 4a fixed to a rotary shaft 4h, and one double-suction impeller 4b fixed to the hub plate 4a. The impeller 4b is made up of a first impeller portion 4bL and a second impeller portion 4bR each provided in one of both sides of the hub plate 4a and having a plurality of vanes. The first impeller portion 4bL includes a rotary shroud 4g provided thereon. The centrifugal fan 4 sucks air through suction openings 4d, 4e on both sides and blows off the sucked air through blowoff openings 4f opened toward an outer circumference of the fan. Further, the centrifugal fan 4 is constructed such that a ratio of an effective width L1 of the first impeller portion 4bL to an effective width L2 of the second impeller portion 4bR is L1:L2=2:0.5–2:1.5.

The hub plate 4a has a diameter Dh smaller than a suction opening diameter D1 of the first impeller portion 4bL provided with the rotary shroud 4g. This gives the centrifugal fan 4 a structure capable of being integrally molded by using the molds 11a, b. For example, injection molding is performed by first placing the hub plate 4a made of an iron core having the diameter Dh in the mold 11b through an opening of the mold 11b with the diameter D1, mating the mold 11a with the mold 11b, and then injecting resin through a not-shown injection port.

More specifically, the second impeller portion 4bR, parts of the first impeller portion 4bL outside the outer diameter Dh of the hub plate 4a, and end surfaces 4gR of the rotary shroud 4g facing the engine 5 side can be press-formed by the presser mold 11b from the right in FIG. 3, while parts of the first impeller portion 4bL inside the hub plate 4a, front edges of parts of the first impeller portion 4bL outside the outer diameter Dh of the hub plate 4a, and end surfaces 4gL of the rotary shroud 4g facing the radiator 6c side can be press-formed by the presser mold 11a from the left in FIG.

3. Because the centrifugal fan thus has the structure capable of being integrally molded, the production cost of the fan can be greatly reduced. Also, the provision of the rotary shroud 4g reduces the occurrence of turbulence in a flow path on the side of the first impeller portion 4bL, improves the fan efficiency, and lessens fan noise.

Returning to FIG. 1, in the engine cooling system constructed as described above, there are formed two flow paths of cooling air on the radiator 6c side and the engine 5 side looking from the centrifugal fan 4.

More specifically, the first cooling air 50 passing the flow path on the radiator 6c side enters the engine room 1 through the cooling air inlet port 7a from the exterior of the engine room 1, and is throttled by the suction tube 8a after passing the heat exchangers such as the intercooler 6a, the oil cooler 6b and the radiator 6c, followed by entering the centrifugal fan 4. After that, the first cooling air 50 is blown off toward the outer circumference of the centrifugal fan 4 and then discharged to the exterior through the exhaust port 9 in the upper wall of the engine room 1.

Also, the second cooling air 51 passing the flow path on the engine 5 side enters the engine room 1 through the cooling air inlet ports 7b, 7b from the exterior of the engine room 1, and flows around the engine 5, the various electric equipments such as the alternator 10, and the oil pan 14 while cooling them. After that, the second cooling air 51 is throttled by the suction tube 8b before entering the centrifugal fan 4, is blown off toward the outer circumference of the centrifugal fan 4, and is then discharged to the exterior through the exhaust port 9 in the upper wall of the engine room 1 together with the first cooling air 50 on the radiator 6c side.

In this embodiment constructed as described above, the flow path of the second cooling air 51 for cooling the engine 5 and the electric equipments such as the alternator 10 can be separated from the flow path of the first cooling air 50 for cooling the heat exchangers such as the intercooler 6a, the oil cooler 6b and the radiator 6c. Therefore, the cooling air is not required to be discharged at a large flow rate from the engine 5 side unlike conventional, and the flow rate of the second cooling air 51 on the engine 5 side can be set to a smaller value (¼–¾ of the flow rate of the first cooling air 51 as described later) just required for cooling the engine 5 side. Consequently, since the cooling air inlet ports 7b, 7b as openings on the engine 5 side can be made smaller than conventional, it is possible to increase the degree of sealing on the engine 5 side and to reduce noise.

Also, since the flow path of the second cooling air 51 for cooling the engine 5 and the electric equipments such as the alternator 10 has a different route from the flow path of the first cooling air 50 for cooling the heat exchangers such as the intercooler 6a, the oil cooler 6b and the radiator 6c, high-temperature air heated after cooling the heat exchangers is avoided from flowing around the electric equipments, etc. unlike conventional. Therefore, the effect of cooling the electric equipments, etc. can be enhanced and the reliability of the electric equipments, etc. can be increased. Further, this results in no need of considering heat resistance for the electric equipments, etc. which have to been heat-resistant in the past, and hence in reduced cost. Further, the enhanced effect of cooling the engine 5 makes it possible to reduce a proportion of the cooling ability to be achieved by water cooling in the total ability required for cooling the engine, and to reduce the cooling ability required for the radiator 6c. Consequently, the size and cost of the radiator 6c can be cut down.

Recently, there has been a tendency for engine rooms to have large resistance in cooling flow paths because of such demands as for providing the intercooler 6a like the engine room 1 in this embodiment, improving the degree of sealing of the engine room for a reduction in noise, and making the engine room more compact. In spite of such a tendency, cooling air is required to be supplied at a flow rate comparable to conventional. This entails the necessity of cooling fans capable of inducing cooling air at a larger flow rate and a higher pressure. Bearing the above in mind, the engine cooling system of this embodiment employs, as a fan, the centrifugal fan 4 which can induce cooling air at a larger flow rate and a higher pressure than an axial fan and an angular axial fan and which is also advantageous in reducing noise, on an assumption of those fans having the same outer diameter and the same rotational speed. This point will now be described with reference to FIG. 5.

Figure 5:
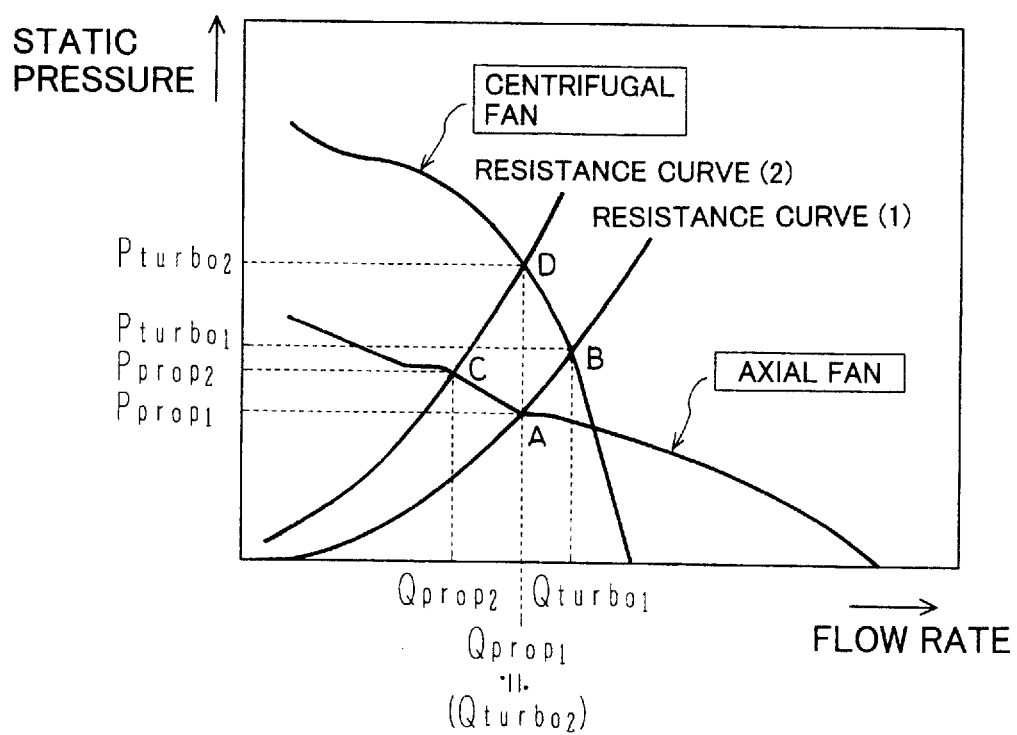
FIG. 5 is a graph showing, by way of example, fan characteristics of an axial fan and a centrifugal fan on condition that both the fans have the same outer diameter and the same rotational speed.

FIG. 5 is a graph showing, by way of example, fan characteristics of an axial fan and a centrifugal fan on condition that both the fans have the same outer diameter and the same rotational speed. In FIG. 5, the horizontal axis represents flow rate and the vertical axis represents static pressure. Characteristic curves denoted by "axial fan" and "centrifugal fan" indicate characteristics of the axial fan and the centrifugal fan set alone (i.e., a characteristic of each sole fan measured with the fan not disposed in a flow path). Two resistance curves (1) and (2) represent characteristics of cooling flow paths alone in engine rooms (i.e., characteristics determined uniquely by the structures of the flow paths). Then, intersect points between the fan characteristic curves and the resistance curves indicate working points resulted when the relevant fan is disposed in the relevant flow path, and provide the pressure and flow rate resulted in respective cases. Note that, of the resistance curves (1) and (2), the resistance curve (1) represents resistance of the cooling flow path in a conventional engine room, and the resistance curve (2) represents a characteristic of the cooling flow path in a recent engine room designed to meet the demands for providing an intercooler, improving the degree of sealing of the engine room for a reduction in noise, and making the engine room more compact.

First, in the case of using the axial fan in the conventional engine room, the resultant flow rate and static pressure are Qprop1 and Pprop1, respectively, as indicated by the intersect point A between the characteristic curve denoted by "axial fan" and the resistance curve (1). On the contrary, in the case of using the centrifugal fan in the conventional engine room, the resultant flow rate and static pressure, are Qturbo1 and Pturbo1, respectively, as indicated by the intersect point B between the characteristic curve denoted by "centrifugal fan" and the resistance curve (1). Thus, with the same outer diameter and the same rotational speed, the centrifugal fan has properties of enabling cooling air to be induced at a higher pressure and a larger flow rate than the axial fan due to the centrifugal action (details will be described later).

If the conventional axial fan is applied as it is to the recent engine room, the resultant flow rate and static pressure are Qprop2 and Pprop2, respectively, as indicated by the intersect point C between the characteristic curve denoted by "axial fan" and the resistance curve (2). While the static pressure is raised from Pprop1 resulted above when the conventional axial fan is applied to the conventional engine room, thereby enabling cooling air to be induced at a higher pressure, the flow rate is reduced from Qprop1 resulted above when the conventional axial fan is applied to the conventional engine room. In order to provide a flow rate comparable to Qprop1 resulted in the conventional engine room, therefore, the rotational speed must be increased, which necessarily magnifies noise to a large extent. On the other hand, when the centrifugal fan is applied to the recent engine room, the resultant flow rate and static pressure can be given as Qturbo2 (=Qprop1) and Pturbo2, respectively, as indicated by the intersect point D between the characteristic curve denoted by "centrifugal fan" and the resistance curve (2). It is thus possible to provide almost the same flow rate as Qprop1, i.e., the flow rate resulted when the axial fan is applied to the conventional engine room, and to raise the static pressure twice or more Pprop1, i.e., the static pressure resulted when the axial fan is applied to the conventional engine room.

Those characteristics of the centrifugal fan can be explained, by way of example, as follows.

Generally, a theoretical pressure rise Pth of a fan is expressed by the following formula:

$$Pth = P(u_2^2 - u_1^2)/2 + P(v_2^2 - v_1^2)/2 + P(w_2^2 - w_1^2)/2$$

where u is the circumferential speed of the fan, v is the absolute speed of the flow, w is the relative speed of the flow, and suffixes 1, 2 represent that corresponding values are measured at an inlet and an outlet of the fan, respectively.

In the above formula, the first term of the right side, i.e., $P(u_2^2-u_1^2)/2$, represents a pressure rise due to the effect of centrifugal forces, the second term of the right side, i.e., $P(v_2^2-v_1^2)/2$, represents change in kinetic energy (rise of dynamic pressure), and the third term of the right side, i.e., $P(w_2^2-w_1^2)/2$, represents a pressure rise due to the effect of slowdown in the flow path. Looking now at the first term, the value of the first term for an axial fan is equal to zero (0) because the axial fan has an inlet and an outlet of the same diameter and hence $u_1 - u_2$. For a centrifugal fan, however, the effect of centrifugal forces due to the first term is maximally developed because the centrifugal fan has a fan outlet larger than a fan inlet. Accordingly, the centrifugal fan can induce cooling air at a higher pressure than the axial fan, and hence can easily supply the cooling air at a larger flow rate. Note that while the characteristic of a centrifugal fan has been explained above in comparison with that of an axial fan, the above explanation is also equally applied to comparison with an angular axial fan.

As described above, by using the centrifugal fan 4 as a cooling fan, cooling air can be induced at a larger flow rate and a higher pressure than the axial fan and the angular axial fan with the same outer diameter and the same rotational speed. Accordingly, even with intent to induce cooling air at a larger flow rate and a higher pressure to provide a flow rate in the recent engine room comparable to conventional, the rotational speed is not required to be increased unlike the axial fan and the angular axial fan, and noise can be reduced. Further, since the rotary shroud 4g is provided on the first impeller portion 4bL, the cooling air is prevented from leaking radially through gaps between the suction tube 8a and the first impeller portion 4bL, thus enabling the fan efficiency to be improved. Noise can be further reduced correspondingly.

Also, in the conventional structure using an axial fan, because cooling air blown off from the axial fan cools an engine disposed downstream of the fan, rotation of the fan causes a stream of cooling air, including a swirling component, to strike against complicated shapes defined by the engine and various members surrounding it, thereby locally producing reversed streams of the cooling air. These reversed streams impede the cooling air from flowing smoothly. By contrast, in the cooling system of this embodiment, since the engine 5 is disposed upstream of the centrifugal fan 4, the second cooling air 51 including no swirling components flows toward the centrifugal fan 4 along the surface of the engine 5 and the surface of the oil pan 14 below the engine 5. As a result, the occurrence of reversed streams produced in the conventional system can be held down.

Further, by setting the ratio of the effective width L1 of the first impeller portion 4bL to the effective width L2 of the second impeller portion 4bR to L1:L2=2:0.5–2:1.5, a ratio of the flow rate of the first cooling air 50 to the flow rate of the second cooling air 51 is given by W1:W2=2:0.5–2:1.5. This is effective in optimizing flow rate balance between the first cooling air 50 and the second cooling air 51. That point will be described with reference to FIG. 6.

Figure 6:
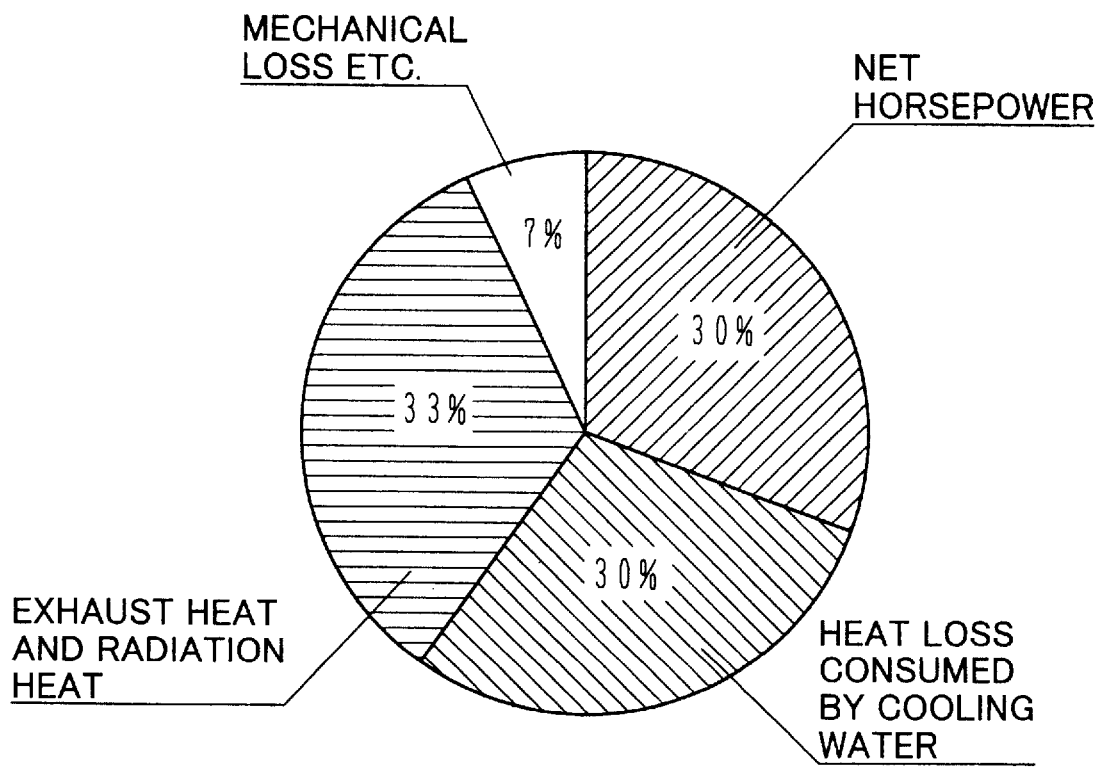
FIG. 6 is a graph showing percentages of respective heat values produced as horsepower and consumed as various losses on an assumption that the total heat value generated by an engine is 100%.

FIG. 6 shows percentages of respective heat values produced as horsepower and consumed as various losses on an assumption that the total heat value generated by an engine is 100%. As shown, it is generally known that, of the total heat value 100% generated by an engine, the percentage of the heat value consumed by cooling of radiator water, for example, is about 30%, and the percentage of the heat value consumed as exhaust heat and radiation heat from outer walls of the engine is about 33% (Internal Combustion Engine Handbook, by Asakura Shoten, Publisher). Then, what percentage of the latter 33% is occupied by radiation heat can be calculated, by way of example, as follows.

In general, the relationship between the total heat value and horsepower of an engine is expressed by the following basic formula:

$$Q = Ne \times b \times Hu/60$$

where

Q: heat value discharged by cooling water [kcal/min]

Ne: horsepower [PS]

b: fuel consumption rate [kg/PSHr]

Hu: low heat value generated by fuel (=10500 [kcal/kg])

Taking a typical fuel consumption rate of $P \leq 170$ [g/PSh], for example, the total heat value Q generated by the engine is calculated below from the above basic formula:

$$P:Q_p = 10500 \text{ [kcal/kg]} 170 \times 10^{-3} \text{ [kg/PSh]} \times 135 \text{ [PS]} = 240975 \text{ [kcal/h]}$$

Then, because the percentage of the exhaust heat and the radiation heat is 33% as mentioned above, the heat value consumed as the exhaust heat and the radiation heat is given by:

$$\text{(exhaust heat+radiation heat)} = 240975 \times 0.33 = 79522 \text{ [kcal/h]} \quad (1)$$

On the other hand, the exhaust heat discharged through a silencer is expressed below on condition that the exhaust temperature is 300° C., the ambient air temperature is 20° C., the flow rate is 313 [m³/s], and the specific weight is 0.596 [kg/m³]:

$$\text{(exhaust heat)} = 0.24 \text{ [kcal/kg} \cdot \text{deg]} \times (300 - 20) \text{ [deg]} \times \quad (2)$$
$$313 \text{ [m}^3\text{/s]} \times 0.596 \text{ [kg/m}^3\text{]} \times 3600 \text{ [s]} = 45230 \text{ [kcal/h]}$$

Accordingly, from (1) and (2), the radiation heat is given by:

(radiation heat) = 79522 − 45230
= 34291 [kcal/h]

This value corresponds to about 14.2% of above Q (=240975 [kcal/h]). Thus, of the total heat value 100% generated by the engine, the percentage of the heat value consumed by cooling of radiator water is about 30% and the percentage of the heat value consumed as exhaust heat from outer walls of the engine is about 14.2%.

Applying the above consideration to the engine 5 of this embodiment, the former percentage practically corresponds to the heat value cooled by the first cooling air 50 in the radiator 6c, and the latter percentage practically corresponds to the heat value cooled by the second cooling air 51 around the engine. Therefore, on an assumption that the heat value to be cooled is practically in proportion to the flow rate of cooling air, it is optimum from the standpoint of heat value balance that the centrifugal fan 4 having the centrifugal double-impeller structure is constructed to provide the ratio W1:W2=2:1 of the flow rate of the first cooling air 50 to the flow rate of the second cooling air 51. By so setting the flow rate ratio, the loss of horsepower consumed by the centrifugal fan can be suppressed and a reduction in fuel economy can be prevented. Also, since the centrifugal fan is not needed to be rotated at a rotational speed in excess of a required value, noise can be educed. Further, overcooling of the engine can be avoided that may occur due to the excessively large flow rate W2 of the second cooling air 51.

Taking into account variations in an actual engine room caused by a difference in resistance against passing air between the flow path on the heat exchangers 6a–c side through which the first cooling air 50 passes and the flow path on the engine 5 side through which the second cooling air 51 passes, manufacturing errors and so on, however, a proper range the flow rate ratio of the first cooling air 50 to the second cooling air 51 has of W1:W2=2:0.5–2:1.5.

Accordingly, in this embodiment, by setting the ratio of the effective width L1 of the first impeller portion 4bL to the effective width L2 of the second impeller portion 4bR to L1:L2=2:0.5–2:1.5, flow rate balance between the first cooling air 50 and the second cooling air 51 can be optimized.

While the first embodiment is designed such that one of the two cooling air flow paths (i.e., the first cooling air 50) is allocated to cool the heat exchangers such as the intercooler 6a, the oil cooler 6b and the radiator 6c, and the other cooling air flow path (i.e., the second cooling air 51) is allocated to cool the electric equipments such as the alternator 10, the engine 5 and the oil pan 14, those objects to be cooled may be distributed to the two cooling air flow paths in any other suitable way than above. For example, the intercooler 6a of the heat exchangers may be disposed downstream of the suction opening 7b on the engine 5 side. In essence, the similar advantages as in the above first embodiment can be obtained if at least one heat exchanger is disposed in the cooling air flow path not on the engine 5 side.

Also, while the rotary shroud 4g is provided on the first impeller portion 4bL in the first embodiment, the rotary shroud 4g is not always required to be provided just for the purpose of improving the effect of cooling the electric equipments, etc. As an alternative, rather than providing the rotary shroud 4g on only the first impeller portion 4bL, a separate rotary shroud may be additionally provided on the second impeller portion 4bR as well so that both the first impeller portion 4bL and the second impeller portion 4bR have rotary shrouds. This modification can improve the fan efficiency and reduce noise.

Figure 7:
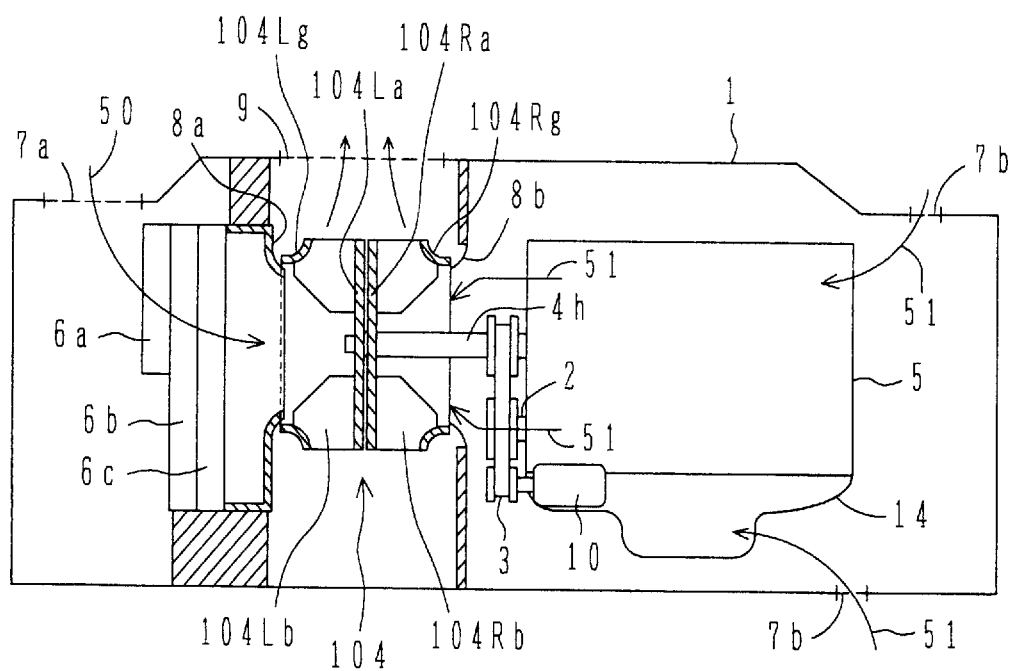
FIG. 7 is a longitudinal sectional view showing a modified embodiment including two single-suction impellers.

Further, while in the above first embodiment the centrifugal fan 4 has the double-suction impeller 4b which sucks air from two directions and blows off the air in one direction, the centrifugal fan is not limited to such a structure, but may comprise two single-suction impellers arranged in back-to-back relation. This modified embodiment is shown in FIG. 7. Equivalent members to those in the first embodiment are denoted by the same reference numerals.

FIG. 7 is a side sectional view showing the structure of an engine room in which is installed an engine cooling system according to the modified embodiment including two single-suction impellers. This modified embodiment differs from the first embodiment shown in FIG. 1 in that a centrifugal fan 104 made up of two single-suction impellers 104Lb, 104Rb with their suction openings facing away from each other in opposite directions is provided in place of the centrifugal fan 4 made up of one double-suction impeller 4b. The centrifugal fan 104 comprises a first hub, e.g., a hub plate 104La, fixed to the rotary shaft 4h, a first impeller 104Lb fixed to the hub plate 104La, a second hub, e.g., a hub plate 104Ra, fixed to the rotary shaft 4h, a rotary shroud 104Lg fixed to the first impeller 104Lb on the suction side, a second impeller 104Rb fixed to the hub plate 104Ra, and a rotary shroud 104Rg fixed to the second impeller 104Rb on the suction side. Then, the first impeller 104Lb on the left side as viewed in the drawing sucks the first cooling air 50 taken in through the cooling air inlet port 7a and having cooled the intercooler 6a, the oil cooler 6b, the radiator 6c, etc., and blows off the sucked air toward the exhaust port 9. The second impeller 104Rb on the right side as viewed in the drawing sucks the second cooling air 51 taken in through the cooling air inlet ports 7b and having cooled the engine 5, the electric equipments such as the alternator 10, and the oil pan 14, and blows off the sucked air toward the exhaust port 9.

The other construction is substantially the same as in the first embodiment.

This modified embodiment can also provide the similar advantages as in the first embodiment.

In addition to those advantages, when the present invention is applied to the conventional structure using a centrifugal fan made up of one single-suction impeller, the impeller can be reused in fabricating the centrifugal fan according to the above modified embodiment. For this reason, the above modified embodiment can be more easily practiced than the first embodiment in which the impeller 4b made up of the first and second impeller portions 4bL, 4bR must be newly manufactured. Another advantage is that since the first and second single-suction impellers 104Lb, Rb can be each uniquely selected in its outer diameter, the number of vanes, etc. without limitations imposed from mutual relation, the degree of freedom in design can be increased.

Second Embodiment

A second embodiment of the present invention will be described with reference to FIGS. 8 and 9. In this embodiment, a spiral case is provided in addition to the construction of the first embodiment. Equivalent members to those in the first embodiment are denoted by the same reference numerals.

Figure 8:
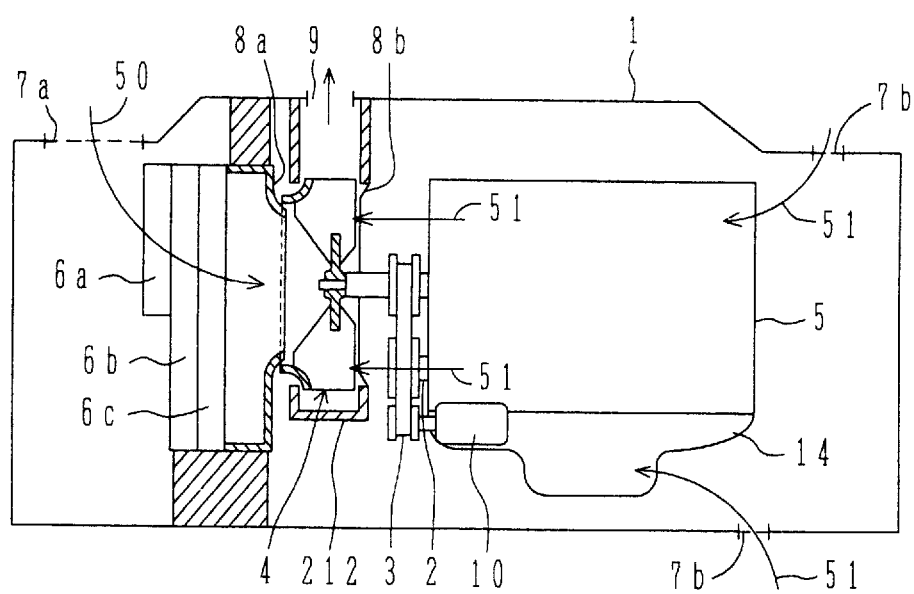
FIG. 8 is a side sectional view showing the structure of an engine room in which an engine cooling system according to a second embodiment of the present invention is installed.

FIG. 8 is a side sectional view showing the structure of the engine room 1 in which an engine cooling system according to this embodiment is installed. This embodiment differs from the first embodiment in that a spiral case 212 is provided to cover an outlet region of the centrifugal fan 4 in the vicinity thereof. The spiral case 212 has a structure dividable into a plurality of parts along a plane containing the rotary shaft of the centrifugal fan 4, and is attached in place after mounting the engine 5, the intercooler 6*a*, the oil cooler 6*b*, the radiator 6*c*, the centrifugal fan 4, etc.

Figure 9:
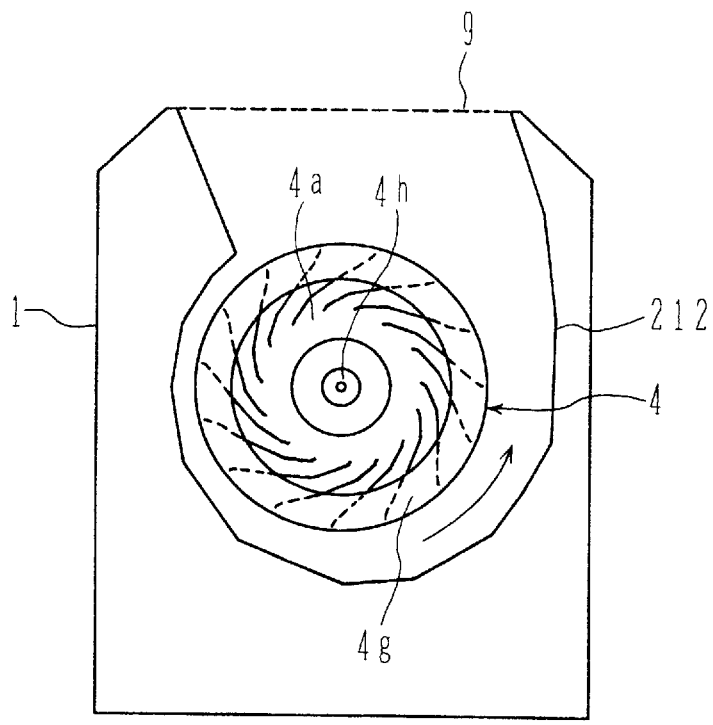
FIG. 9 is a perspective view showing the detailed structure of a spiral case and thereabout shown in FIG. 8.

FIG. 9 is a perspective view showing the detailed structure of the spiral case 212 and thereabout. The spiral case 212 defines a flow path therein which has a shape gradually increasing a cross-sectional area of the flow path.

In the construction shown in FIGS. 8 and 9, as with the first embodiment, the first cooling air 50 having cooled the intercooler 6*a*, the oil cooler 6*b*, the radiator 6*c*, etc. and the second cooling air 51 having cooled the engine 5, the oil pan 14 and the electric equipments such as the alternator 10 are sucked into the centrifugal fan 4 and blown off therefrom. After that, the air is gradually slowed down in the spiral case 212 while restoring pressure, and then discharged through the exhaust port 9.

The other structure is substantially the same as in the first embodiment.

This embodiment can also provide the similar advantages as in the first embodiment. In addition to those advantages, since the swirling components contained in streams from outlets of the centrifugal fan 4, which have been all wasted as pressure loss in the past, can be restored as a pressure with the provision of the spiral case 212, it is possible to improve the fan efficiency and to induce the cooling air at a larger flow rate and a higher pressure correspondingly. As a result of such a higher pressure of the cooling air, the degree of sealing of the engine room 1 can be improved and noise can be further reduced correspondingly.

Third Embodiment

A third embodiment of the present invention will be described with reference to FIG. 10. In this embodiment, a noise absorbing material is added to the construction of the second embodiment. Equivalent members to those in the second embodiment are denoted by the same reference numerals.

Figure 10:
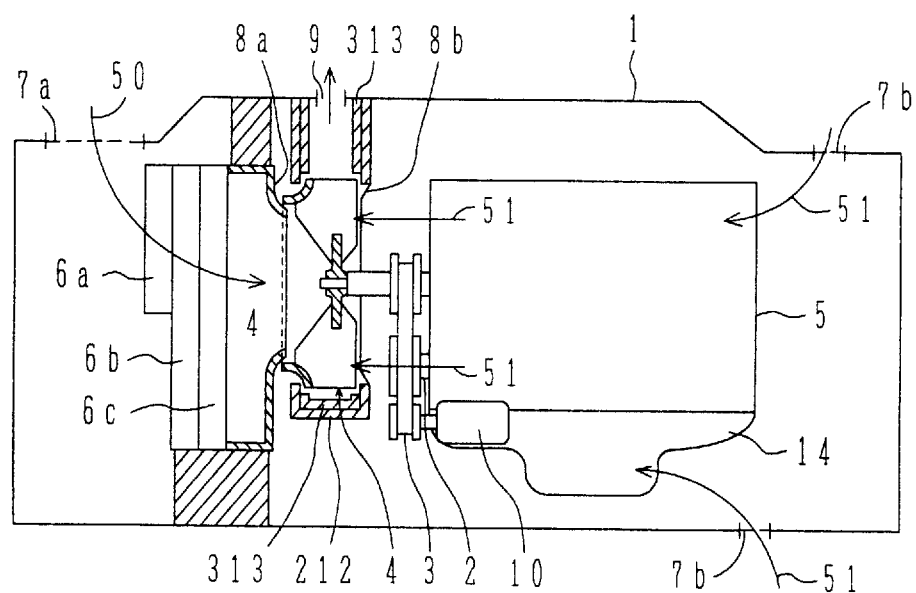
FIG. 10 is a side sectional view showing the structure of an engine room in which an engine cooling system according to a third embodiment of the present invention is installed.

FIG. 10 is a side sectional view showing the structure of the engine room 1 in which an engine cooling system according to this embodiment is installed. This embodiment differs from the second embodiment in that a noise absorbing material 313 is attached to a part of the inner surface of the spiral case 212. As an alternative, the noise absorbing material 313 may be attached to the entire inner surface of the spiral case rather than a part thereof.

The other structure is substantially the same as in the second embodiment.

In addition to the similar advantages as in the second embodiment, this embodiment is also effective in making the engine room 1 quieter as a whole because noise produced by the centrifugal fan 4, which is one of major noise sources, can be absorbed by the noise absorbing material 313.

Fourth Embodiment

A fourth embodiment of the present invention will be described with reference to FIG. 11. In this embodiment, a centrifugal fan is driven by a driving source different from the engine crankshaft.

Figure 11:
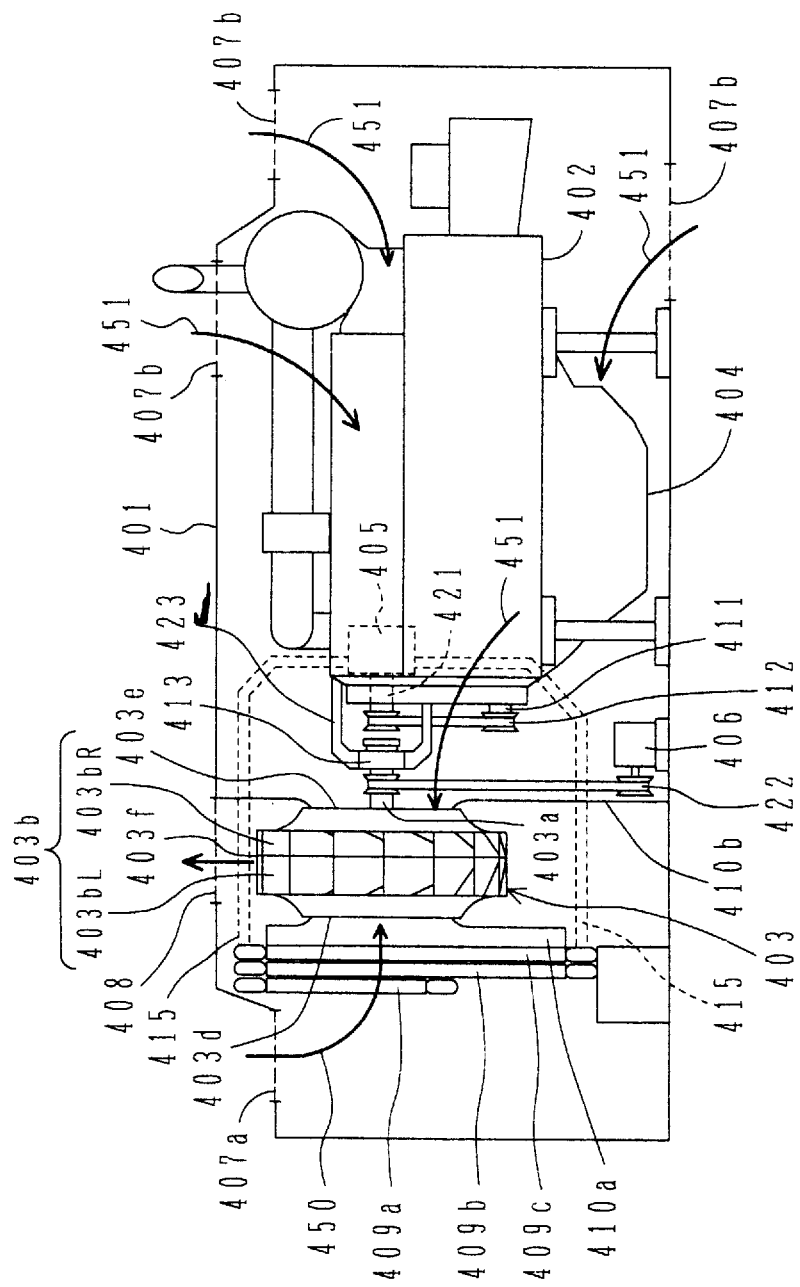
FIG. 11 is a side sectional view showing the structure of an engine room in which an engine cooling system according to a fourth embodiment of the present invention is installed.

FIG. 11 is a side sectional view showing the structure of an engine room in which an engine cooling system according to this embodiment is installed. This embodiment differs from the first embodiment particularly in that a centrifugal fan 403 is driven by an electric motor 406 (described later). It is to be noted that the other structure is also somewhat different in various components from the first to third embodiments, and therefore the following description will be made on all members, including equivalent members to those in the first to third embodiments. The engine cooling system is installed in an engine room 401 in which an engine 402 is mounted. The engine cooling system mainly comprises an intercooler 409*a* for precooling combustion air supplied to the engine 402, an oil cooler 409*b* for cooling a working fluid for a hydraulic excavator, a radiator 409*c* for cooling water to cool the engine 402, a centrifugal fan 403 having a rotary shaft 403*a* rotatably supported by a bearing 413 which is in turn supported by the engine 402 through a bearing support member 423, driving means, e.g., an electric motor 406 to generate driving power from electric energy, for transmitting driving forces to the rotary shaft 403*a* of the centrifugal fan 403 through a fan belt 422, suction tubes 410*a*, 410*b* for introducing two streams of cooling air 450, 451 (described later) to two suction openings 403*d*, 403*e* of the centrifugal fan 403 located on both sides (on the left and right sides as viewed in the drawing), respectively, and a water pump 405 for circulating the cooling water of the engine 402 into the radiator 409*c* through cooling water tubes 415.

The water pump 405 is driven by the power transmitted from a crankshaft 411 of the engine 402 to a rotary shaft (water pump rotary shaft) 421 through a belt 412.

The centrifugal fan 403 is of a centrifugal double-impeller structure comprising two centrifugal impeller structures. The centrifugal fan 403 comprises a hub plate (not shown) fixed to a rotary shaft 403*a*, and one double-suction impeller 403*b* fixed to the hub plate. The impeller 403*b* is made up of a first impeller portion 403*b*L and a second impeller portion 403*b*R each provided in one of both sides of the hub plate and having a plurality of vanes. The centrifugal fan 403 sucks air through the suction openings 403*d*, 403*e* on both sides and blows off the sucked air through blowoff openings 403*f* opened toward an outer circumference of the fan.

In upper and lower walls of the engine room 401, there are formed cooling air inlet ports 407*a*, 407*b* for taking in ambient air, and an exhaust port 408 for discharging air. Though not specifically shown, electric equipments such as an alternator are installed in the engine room 401 near the engine 402.

In the engine cooling system constructed as described above, there are defined two flow paths of cooling air on the radiator 409*c* side and the engine 402 side looking from the centrifugal fan 403.

More specifically, the first cooling air 450 passing the flow path on the radiator 409*c* side enters the engine room 401 through the cooling air inlet port 407*a* from the exterior of the engine room 401, and is throttled by the suction tube 410*a* after passing the heat exchangers such as the intercooler 409*a*, the oil cooler 409*b* and the radiator 409*c*, followed by entering the centrifugal fan 403. After that, the first cooling air 450 is blown off toward the outer circumference of the centrifugal fan 403 and then discharged to the exterior through the exhaust port 408 in the upper wall of the engine room 401.

Also, the second cooling air 451 passing the flow path on the engine 402 side enters the engine room 401 through the cooling air inlet ports 407*b* from the exterior of the engine room 401, and flows around the engine 402 and the oil pan 404, etc. disposed near and below the engine 402, while cooling them. After that, the second cooling air 451 is throttled by the suction tube 410*b* before entering the centrifugal fan 403, is blown off toward the outer circumference of the centrifugal fan 403,; and is then discharged to the exterior through the exhaust port 408 in the upper wall of the engine room 401 together with the first cooling air 450 on the radiator 409c side.

Moreover, the first impeller portion 403bL and the second impeller portion 403bR are constructed such that a flow rate ratio of the first cooling air 450 to the second cooling air 451 is W1:W2=2:0.5–2:1.5.

In addition to the similar advantages as in the first embodiment, this embodiment constructed as described above can also provide advantages below.

First, since the rotational speed of the centrifugal fan 403 can be uniquely set by the electric motor 406 independently of the rotational speed of the engine 402, the centrifugal fan 403 can be rotated at an optimum rotational speed depending on working circumstances without being affected by the rotational speed of the engine 402 (=rotational speed of the water pump 405). In work at low temperature, for example, the conventional structure where the fan is rotated directly depending on the engine rotation may cause overcooling of the engine due to the excessive rotation of the centrifugal fan resulted from securing a usual rated rotational speed of the engine. By contrast, in this embodiment, since the rotational speed of the centrifugal fan 403 can be set to a smaller value while maintaining the rotational speed of the engine 402 at the usual rated value, the engine 402 can be avoided from lowering its performance due to overcooling, and the lower rotational speed of the centrifugal fan 403 can prevent an increase in noise generated from the fan. As another example, in work performed in highlands, the conventional structure where the fan is rotated directly depending on the engine rotation may cause a reduction in engine performance due to deficiency of the cooling ability and resultant overheating of the engine, because the engine rotational speed is set to a smaller value to prevent stalling of the engine and the rotational speed of the centrifugal fan is reduced correspondingly. By contrast, in this embodiment, since the rotational speed of the engine 402 can be set to a smaller value while maintaining the rotational speed of the centrifugal fan 403 as usual, the engine 402 can be avoided from lowering its performance due to overheating.

Also, since the rotational speed of the engine 402 is set regardless of the rotational speed of the centrifugal fan 403, an advantage of improving fuel economy can also be obtained.

The weight of the centrifugal fan 403 may be possibly larger than that of the conventional axial fan. In this embodiment, however, since the centrifugal fan 403 is not fixed to the rotary shaft 421 of the engine 402, but driven by the electric motor 406, the load imposed on a bearing (though not shown, installed in the engine 402) of the rotary shaft 421 of the engine 402 is not increased. In other words, the larger weight of the centrifugal fan 403 can be borne by designing the bearing 413 of the fan rotary shaft 403a so as to withstand the larger weight case by case. Therefore, the engine cooling system of this embodiment can also be easily applied even to an existing engine which has been designed in anticipation of the use of an axial fan, just by newly providing the bearing support member 423 and the bearing 413.

Further, the fan center position (=position of the fan rotary shaft) optimum for cooling the intercooler 409a, the oil cooler 409b and the radiator 409c depends on the sizes and shapes of those three heat exchangers. In the conventional structure where the fan rotary shaft is directly rotated by the engine crankshaft, a difficulty in shifting the fan rotary shaft with respect to the engine position may inevitably entails an offset of the fan rotary shaft from an optimum position and give rise to a reduction in the flow rate of cooling air. By contrast, in this embodiment, since the fan rotary shaft 403a can be set in any desired position, it is possible to shift the fan rotary shaft 403a to the optimum position depending on the three heat exchangers 409a–c and to prevent a reduction in the flow rate of cooling air.

While the centrifugal fan 403 made up of one double-suction impeller 403b is used in the above fourth embodiment, a centrifugal fan made up of two single-suction impellers with their suction openings facing away from each other in opposite directions may be used in place of the centrifugal fan 403 as with the modified embodiment shown in FIG. 7. This case can also provide the similar advantages.

Also, while the above fourth embodiment has been illustrated as driving the impeller 403b by the electric motor 406, a hydraulic motor driven with hydraulic energy (hydraulic fluid) may be used in place of the electric motor 406. This case can also provide the similar advantages.

Further, while the above fourth embodiment uses the electric motor 406 which is a driving source totally independent of the rotation of the engine 402, it is not limited to the use of such an independent driving source, but may be modified as follows. Specifically, the centrifugal fan 403 may be rotated at a proper rotational speed depending on working circumstances by providing rotational speed changing means which receives the rotation of the engine 402 transmitted thereto, changes the input rotational speed at a desired speedup/slowdown ratio, and then outputs the resultant rotational speed to the centrifugal fan 403. The rotational speed changing means may be made up of, e.g., a speed reducing gear mechanism having plural types of gears with the different numbers of teeth from each other, and speedup/slowdown ratio control means for controlling the speedup/slowdown ratio of transmitted rotation in the speed reducing gear mechanism, e.g., a gear shifting mechanism for shifting gear positions in the speed reducing gear mechanism. These cases can also provide the similar advantages.

In the above first to fourth embodiments, the intercoolers 6a, 409a, the oil coolers 6b, 409b and the radiators 6c, 409c are provided as examples of heat exchangers. However, the heat exchangers are not limited to those examples, but may include any other one(s) such as a condenser for an air conditioner. These cases can also provide the similar advantages.

Moreover, the above first to fourth embodiments have been described in connection with, by way of example, the engine cooling system equipped on construction machines. However, the present invention is not limited to such an application, but also applicable to engine cooling systems equipped on automobiles, agricultural machines and other types of machines. These cases can also provide the similar advantages.

INDUSTRIAL APPLICABILITY

According to the present invention, since the cooling flow path of the second cooling air for cooling the engine side can be separated from the cooling flow path of the first cooling air for cooling the heat exchangers, the size of an opening to be formed on the engine side can be set smaller than conventional. Accordingly, the degree of sealing on the engine side can be improved and noise can be reduced. Also, since high-temperature air heated after cooling the heat exchangers is prevented from flowing around the electric equipments, etc. unlike conventional, it is possible to enhance the effect of cooling the electric equipments, etc. and to improve the reliability of the electric equipments, etc.

We claim:

1. An engine cooling system comprising at least one heat exchanger disposed in an engine room with an engine mounted therein and including a radiator for cooling water to cool said engine, and a cooling fan rotated through a rotary shaft for inducing cooling air to cool said heat exchanger, said engine, and electric equipments disposed around said engine, wherein:

said cooling fan is a centrifugal fan of a centrifugal double-impeller structure for inducing first cooling air taken into said engine room through a first air inlet port to cool said heat exchanger and second cooling air taken into said engine room through a second air inlet port to cool said engine and said electric equipments, and said centrifugal fan is constructed to meet $$W1:W2=2:0.5-2:1.5$$

on an assumption that flow rates of said first cooling air and said second cooling air induced by said centrifugal fan are W1 and W2, respectively.

2. An engine cooling system according to claim 1, wherein said centrifugal fan is constructed to meet $$W1:W2=2:1$$

on an assumption that flow rates of said first cooling air and said second cooling air induced by said centrifugal fan are W1 and W2, respectively.

3. An engine cooling system according to claim 1, wherein said centrifugal fan comprises one double-suction impeller made up of a first impeller portion fixed to a hub, which is fixed to said rotary shaft, for sucking said first cooling air from one end side of said rotary shaft and blowing off said first cooling air toward an outer circumference of said centrifugal fan, and a second impeller portion fixed to said hub on the side opposite to said first impeller portion for sucking said second cooling air from the other end side of said rotary shaft and blowing off said second cooling air toward the outer circumference of said centrifugal fan.

4. An engine cooling system according to claim 1, wherein said centrifugal fan comprises a first single-suction impeller fixed to a first hub, which is fixed to said rotary shaft, for sucking said first cooling air from one end side of said rotary shaft and blowing off said first cooling air toward an outer circumference of said centrifugal fan, and a second single-suction impeller fixed to a second hub, which is fixed to said rotary shaft, for sucking said second cooling air from the other end side of said rotary shaft and blowing off said second cooling air toward the outer circumference of said centrifugal fan.

5. An engine cooling system according to claim 1, further comprising a spiral case disposed near an outlet region of said centrifugal fan for slowing down the cooling air blown off from said centrifugal fan to restore pressure of the blow-off cooling air.

6. An engine cooling system according to claim 5, wherein a noise absorbing material is attached to at least part of an internal surface of said spiral case.

7. An engine cooling system according to claim 1, further comprising driving means for transmitting driving forces to rotate the rotary shaft of said centrifugal fan and enabling a rotational speed of said centrifugal fan to be set independently of a rotational speed of said engine.

8. An engine cooling system according to claim 7, wherein said driving means is any one of means for generating the driving forces from electrical energy and means for generating the driving forces from hydraulic energy.

9. A construction machine comprising an engine mounted in an engine room, a hydraulic pump driven by said engine, actuators driven by a hydraulic fluid delivered from said hydraulic pump, and an engine cooling system including at least one heat exchanger including a radiator for cooling water to cool said engine and a cooling fan rotated through a rotary shaft for inducing cooling air to cool said heat exchanger, said engine, and electric equipments disposed around said engine, wherein:

said cooling fan is a centrifugal fan of a centrifugal double-impeller structure for inducing first cooling air taken into said engine room through a first air inlet port to cool said heat exchanger and second cooling air taken into said engine room through a second air inlet port to cool said engine and said electric equipments, and said centrifugal fan (4, 104, 403) is constructed to meet $$W1:W2=2:0.5-2:1.5$$

on an assumption that flow rates of said first cooling air and said second cooling air induced by said centrifugal fan are W1 and W2, respectively.

* * * * *